United States Patent
Kobayashi et al.

(10) Patent No.: US 10,109,841 B2
(45) Date of Patent: Oct. 23, 2018

(54) STORAGE CELL SYSTEM, STORAGE CELL MODULE AND METHOD FOR OPERATING STORAGE CELL SYSTEM

(71) Applicant: KABUSHIKI KAISHA TOSHIBA, Minato-ku (JP)

(72) Inventors: Hiroyuki Kobayashi, Yokohama (JP); Fujio Nomura, Kawasaki (JP); Kaoru Koiwa, Tokyo (JP); Takeshi Yasuda, Yokohama (JP); Tomomi Kageyama, Tokyo (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/838,530

(22) Filed: Dec. 12, 2017

(65) Prior Publication Data

US 2018/0102529 A1 Apr. 12, 2018

Related U.S. Application Data

(63) Continuation of application No. PCT/JP2015/067875, filed on Jun. 22, 2015.

(51) Int. Cl.
*H01M 2/34* (2006.01)
*H01M 2/20* (2006.01)
(Continued)

(52) U.S. Cl.
CPC ............. *H01M 2/34* (2013.01); *H01G 4/385* (2013.01); *H01G 4/40* (2013.01); *H01M 2/202* (2013.01);
(Continued)

(58) Field of Classification Search
CPC ...... H01M 2/34; H01M 10/425; H01M 2/202; H01M 2200/00; H01M 2010/4271; H01G 4/385; H01G 4/40
See application file for complete search history.

(56) References Cited

U.S. PATENT DOCUMENTS

2011/0003182 A1 1/2011 Zhu
2013/0249278 A1 9/2013 Kageyama et al.
(Continued)

FOREIGN PATENT DOCUMENTS

JP 5-91151 U 12/1993
JP 11-174136 7/1999
(Continued)

OTHER PUBLICATIONS

International Search Report dated Sep. 8, 2015 in PCT/JP2015/067875, filed on Jun. 22, 2015.
(Continued)

*Primary Examiner* — Stewart A Fraser
(74) *Attorney, Agent, or Firm* — Oblon, McClelland, Maier & Neustadt, L.L.P.

(57) ABSTRACT

According to one embodiment, in a storage cell system, cell lines each formed by connecting a prescribed number of storage cells in series are connected in parallel to form a storage cell module. Each unit is formed by connecting a prescribed number of storage cell modules in parallel. Outputs of a number of units corresponding to load capacity are linked in parallel and supplied to a load. At this time, current is limited to an extent that the storage cells are not damaged by interposing a current-limiting resistor in an output line of the storage cell module.

3 Claims, 3 Drawing Sheets

(51) Int. Cl.
*H01M 10/42* (2006.01)
*H01G 4/40* (2006.01)
*H01G 4/38* (2006.01)

(52) U.S. Cl.
CPC .. *H01M 10/425* (2013.01); *H01M 2010/4271* (2013.01); *H01M 2200/00* (2013.01)

(56) References Cited

U.S. PATENT DOCUMENTS

2014/0084690 A1* 3/2014 Cho .................. H01M 10/425 307/43
2016/0301232 A1 10/2016 Shiobara

FOREIGN PATENT DOCUMENTS

| | | |
|---|---|---|
| JP | 2005-86891 | 3/2005 |
| JP | 2005-323444 | 11/2005 |
| JP | 4120540 | 7/2008 |
| JP | 4120618 | 7/2008 |
| JP | 2009-33936 | 2/2009 |
| JP | 2011-24404 | 2/2011 |
| JP | 2013-179739 | 9/2013 |
| JP | 2014-78340 | 5/2014 |
| JP | 2014-124063 | 7/2014 |
| JP | 2014-236561 | 12/2014 |
| JP | 2014-239630 | 12/2014 |
| JP | 2015-100195 | 5/2015 |

OTHER PUBLICATIONS

Office Action dated Dec. 20, 2016 in Japanese Patent Application 2016-559665, 9 pages (with English-language Translation).
Office Action dated May 9, 2017 in Japanese Patent Application 2016-559665, 11 pages (with English-language Translation).

* cited by examiner

US 10,109,841 B2

STORAGE CELL SYSTEM, STORAGE CELL MODULE AND METHOD FOR OPERATING STORAGE CELL SYSTEM

CROSS-REFERENCE TO RELATED APPLICATIONS

This application is a Continuation Application of PCT Application No. PCT/JP2015/067875, field Jun. 22, 2015, the entire contents of which are incorporated herein by reference.

FIELD

Embodiments described herein relate generally to a storage cell system, a storage cell module and a method for operating a storage cell system.

BACKGROUND

In a storage cell system, serial circuits each formed by connecting a prescribed number of storage cells in series are connected in parallel to form a storage cell module. Each unit is formed by connecting a prescribed number of storage cell modules in parallel. Outputs of a number of units corresponding to load capacity are linked in parallel and supplied to a load. In this system structure, if a single storage cell fails, and backward current is generated, another storage cell in the same module, another storage cell module or another storage cell unit may sequentially fail.

As a countermeasure, in general, the defect portion is limited by managing each unit in a power conditioning system (PCS). However, the PCS is large and requires a space in comparison with storage cell units. Thus, the PCS is not suitable for the application in a small space or the management based on each module.

Apart from the above method, a fuse is connected to each storage cell to protect it from overcurrent. However, in this method, it is not possible to deal with a rapid increase in current in a storage cell having low impedance.

As described above, in the conventional storage cell system, a PCS is employed as a countermeasure to prevent sequential failures caused in the entire system by the failure of a single storage cell and backward current. However, this countermeasure is insufficient as the PCS is disadvantageous in terms of its size.

Embodiments described herein aim to provide a storage cell system, a storage cell module and a method for operating a storage cell system, capable of certainly preventing sequential failures in the entire system even if a storage cell fails.

DETAILED DESCRIPTION

Embodiments will be described hereinafter with reference to the accompanying drawings.

In general, according to one embodiment, there is provided a storage cell system in which outputs of N storage cell units are linked in parallel and supplied to a load, where N is a natural number greater than or equal to two, each of the storage cell units is formed by connecting M storage cell modules in parallel, where M is a natural number greater than or equal to two, and L cell lines each formed by connecting K storage cells in series are connected in parallel to form each of the storage cell modules, where L is a natural number greater than or equal to two, and K is a natural number greater than or equal to one, the storage cell system comprises: a fuse interposed in each of the L cell lines, and disconnecting a cell line from the other cell lines connected in parallel when current flowing in the cell line is an overcurrent; an air circuit breaker interposed in an output line of each of the N storage cell units, and interrupting an output line when current flowing in the output line is an overcurrent; and a current-limiting resistor interposed in an output line of each of the M storage cell modules, and limiting load capacity of the output line, wherein when one of the storage cells has failure, and a backward current occurs in the output line of the storage cell module, the current-limiting resistor performs protective coordination for the backward current by limiting load capacity of the backward current and avoiding the disconnection of the other storage cell modules by the fuse and the interruption of the other storage cell units by the air circuit breaker.

Figure 1:
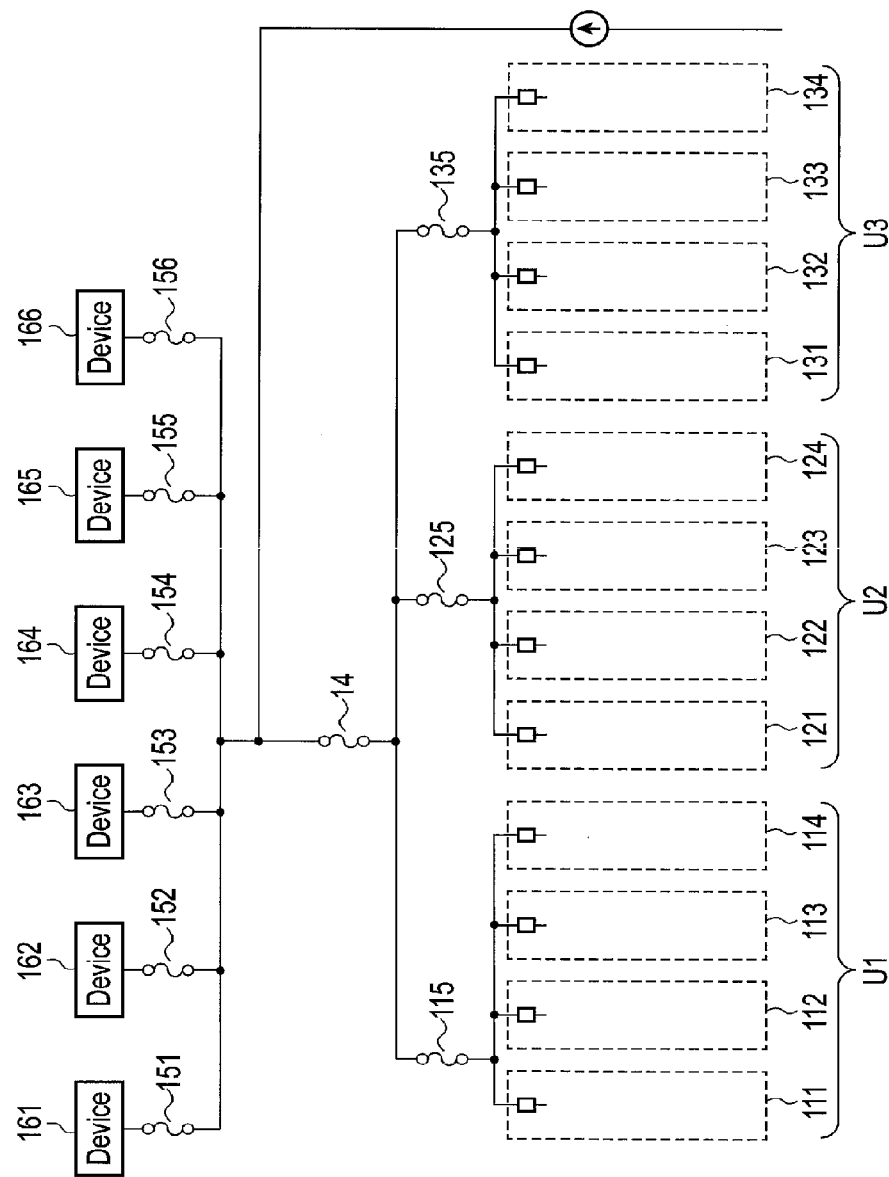
FIG. 1 is a block diagram showing the structure of a storage cell system according to the present embodiment.

FIG. 1 is a block diagram showing the structure of a storage cell system according to the present embodiment. FIG. 1 shows storage cell modules 111 to 114, 121 to 124 and 131 to 134 having the same structure. Four storage cell modules are connected in parallel to form each unit. Air circuit breakers (ACBs) 115, 125 and 135 are inserted into the output lines of units U1 to U3, respectively. The output terminals of units U1 to U3 are connected in parallel to each other, and are connected to the output terminal of a system power source via an ACB 14. For example, loading devices 161 to 166 are connected to the output terminal of the system power source via fuses 151 to 156.

Figure 2:
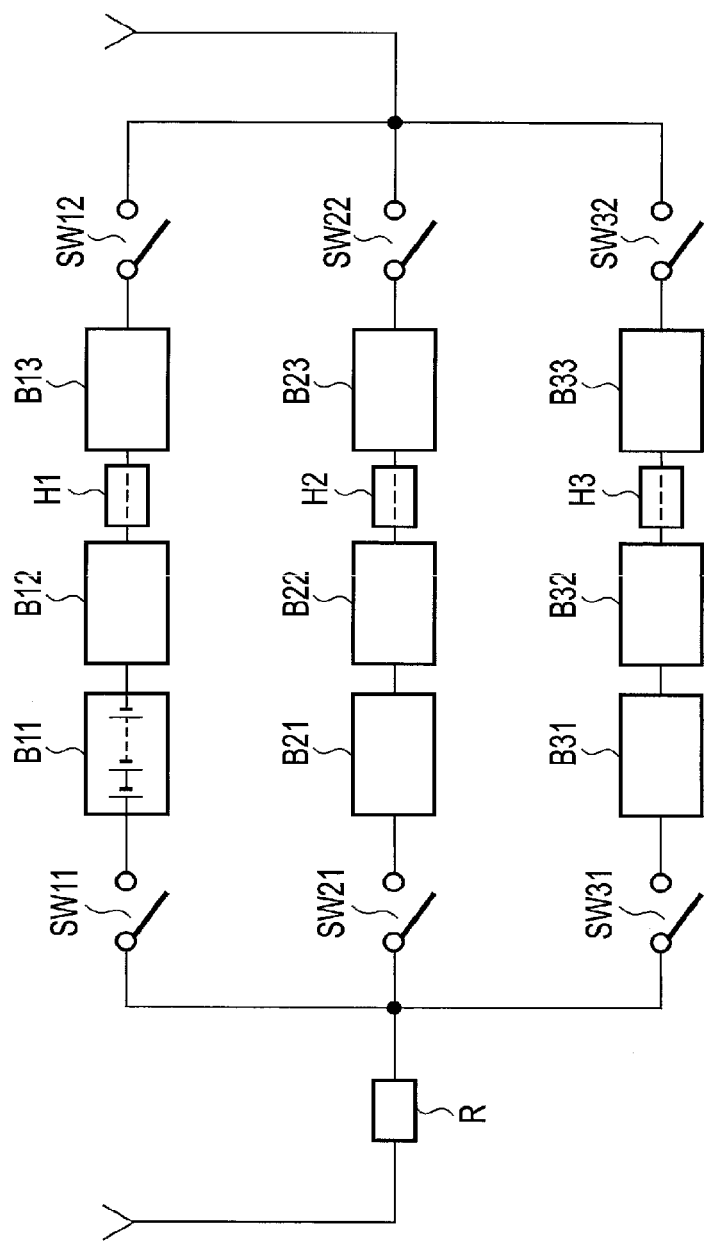
FIG. 2 is a block diagram showing the specific structure of each storage cell module shown in FIG. 1.

FIG. 2 is a block diagram specifically showing one of storage cell modules 111 to 114, 121 to 124 and 131 to 134 used for the above storage cell system. FIG. 2 shows storage cells B11 to B13, B21 to B23 and B31 to B33 (although each block is explained as a single cell here, as exemplarily shown by B11, each block may be a group of cells formed by connecting storage cells in series), fuses H1, H2 and H3, and relay switches SW11, SW12, SW21, SW22, SW31 and SW32. Storage cells B11 to B13, fuse H1 and relay switches SW11 and SW12 are connected in series to form a first cell line. Storage cells B21 to B23, fuse H2 and relay switches SW21 and SW22 are connected in series to form a second cell line. Storage cells B31 to B33, fuse H3 and relay switches SW31 and SW32 are connected in series to form a third cell line. These first to third cell lines are connected in parallel to each other.

Fuses H1, H2 and H3 block the circuits when the current flowing in the cell lines is overcurrent. Relay switches SW11, SW12, SW21, SW22, SW31 and SW32 are used to disconnect or connect the cell lines for replacement when the abnormality of a storage cell is detected. A current-limiting resistor R1 which limits current to a time shorter than that of the ACBs and fuses is connected in series between the parallel circuits of the first to third cell lines and the output terminal of the module.

Figure 3:
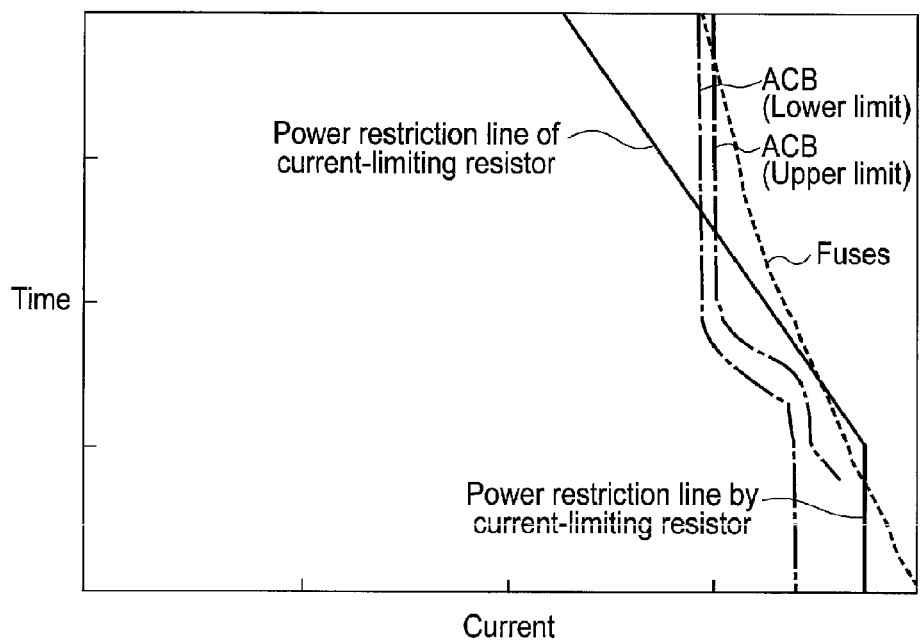
FIG. 3 is a characteristic diagram showing the protective coordination characteristics of each storage cell module shown in FIG. 1.

In the above structure, each cell line in the storage cell module is protected by the fuse. The output line of the storage cell module is protected by the current-limiting resistor R1. The output line of each unit is protected by the ACB. FIG. 3 is a characteristic diagram showing the protective coordination characteristics for dealing with the failure of the storage cells used for the storage cell system having the above structure. FIG. 3 shows the power restriction line A of the current-limiting resistor R, the power restriction line B of the fuses, and the upper limit and lower limit lines C1 and C2 of the ACB.

As shown in FIG. 3, the time required for the current limitation of the current-limiting resistor R is shorter than that of the ACB and fuses within 0.1 seconds. Thus, even if a storage cell fails in the module, the overcurrent caused by backward current is suppressed in a short time before the fuse by the current limitation of the current-limiting resistor R. Subsequently, the fuse responds and disconnects the line including the defective cell. In this way, the failure of the module is avoided. Thus, the effect on the other modules is also avoided.

As described above, the storage cell system of the present embodiment having the above structure is capable of certainly preventing sequential failures in the entire system caused by the failure of a storage cell without using a large protection device such as a PCS.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage cell system in which
outputs of N storage cell units are linked in parallel and supplied to a load, where N is a natural number greater than or equal to two,
each of the storage cell units is formed by connecting M storage cell modules in parallel, where M is a natural number greater than or equal to two, and
L cell lines each formed by connecting K storage cells in series are connected in parallel to form each of the storage cell modules, where L is a natural number greater than or equal to two, and K is a natural number greater than or equal to one,
the storage cell system comprising:
a fuse interposed in each of the L cell lines, and disconnecting a cell line from the other cell lines connected in parallel when current flowing in the cell line is an overcurrent;
an air circuit breaker interposed in an output line of each of the N storage cell units, and interrupting an output line when current flowing in the output line is an overcurrent; and
a current-limiting resistor interposed in an output line of each of the M storage cell modules, and limiting load capacity of the output line, wherein
when one of the storage cells has failure, and a backward current occurs in the output line of the storage cell module, the current-limiting resistor performs protective coordination for the backward current by limiting load capacity of the backward current and avoiding the disconnection of the other storage cell modules by the fuse and the interruption of the other storage cell units by the air circuit breaker.

2. A storage cell module used for a storage cell system for linking outputs of N storage cell units in parallel and supplying the outputs to a load, where N is a natural number greater than or equal to two, in which
each of the storage cell units is formed by connecting the M storage cell modules in parallel, where M is a natural number greater than or equal to two, and
L cell lines each formed by connecting K storage cells in series are connected in parallel to form each of the storage cell modules, where L is a natural number greater than or equal to two, and K is a natural number greater than or equal to one,
the storage cell module comprising:
a fuse interposed in each of the L cell lines, and disconnecting a cell line from the parallel connection when current flowing in the cell line is an overcurrent; and
a current-limiting resistor interposed in an output line in which the L cell lines are connected in parallel, and limiting load capacity of the output line, wherein
when an air circuit breaker is interposed in an output line of each of the N storage cell units and interrupts an output line when current flowing in the output line is an overcurrent, and further when one of the storage cells has failure, and thus, a backward current occurs in an output line of the storage cell module, the current-limiting resistor performs protective coordination for the backward current by limiting load capacity of the backward current and avoiding the disconnection of the other storage cell modules by the fuse and the interruption of the other storage cell units by the air circuit breaker.

3. A method for operating a storage cell system in which
L cell lines each formed by connecting K storage cells in series are connected in parallel to form each storage cell module, where L is a natural number greater than or equal to two, and K is a natural number greater than or equal to one, and
outputs of N storage cell units each formed by connecting the M storage cell modules in parallel are linked in parallel and supplied to a load, where N is a natural number greater than or equal to two, and M is a natural number greater than or equal to two,
the method comprising:
interposing, in each of the L cell lines, a fuse which disconnects a cell line from the storage cell module when current flowing in the cell line is an overcurrent;
interposing, in an output line of each of the N storage cell units, an air circuit breaker which interrupts an output line when current flowing in the output line is an overcurrent; and
interposing, in an output line of each of the M storage cell modules, a current-limiting resistor which limits load capacity of the output line, wherein
when one of the storage cells has failure, and a backward current occurs in the output line of the storage cell module, the current-limiting resistor performs protective coordination for the backward current by limiting load capacity of the backward current and avoiding the disconnection of the other storage cell modules by the fuse and the interruption of the other storage cell units by the air circuit breaker.

* * * * *